(12) United States Patent
Liu et al.

(10) Patent No.: US 9,369,929 B2
(45) Date of Patent: Jun. 14, 2016

(54) USER EQUIPMENT, NETWORK DEVICE AND METHOD FOR ACCESSING NETWORK SYSTEM

(71) Applicant: Huawei Technologies Co., Ltd., Shenzhen (CN)

(72) Inventors: Jixing Liu, Shenzhen (CN); Yi Guo, Shenzhen (CN); Shuhui Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/584,725

(22) Filed: Dec. 29, 2014

(65) Prior Publication Data

US 2015/0133126 A1    May 14, 2015

Related U.S. Application Data

(63) Continuation of application No. PCT/CN2013/080246, filed on Jul. 27, 2013.

(30) Foreign Application Priority Data

Jul. 31, 2012    (CN) .......................... 2012 1 0268408

(51) Int. Cl.
| | |
|---|---|
| H04W 28/08 | (2009.01) |
| H04W 36/00 | (2009.01) |
| H04W 36/30 | (2009.01) |
| H04W 76/02 | (2009.01) |
| H04W 48/18 | (2009.01) |
| H04W 88/08 | (2009.01) |

(52) U.S. Cl.
CPC .......... *H04W 36/0072* (2013.01); *H04W 28/08* (2013.01); *H04W 36/30* (2013.01); *H04W 76/02* (2013.01); *H04W 48/18* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2014/0079007 A1 | 3/2014 | Li et al. | |
| 2015/0126201 A1* | 5/2015 | Beppler | H04W 36/04 455/444 |
| 2015/0223257 A1* | 8/2015 | Wilhelmsson | H04W 76/023 455/452.1 |

FOREIGN PATENT DOCUMENTS

| | | |
|---|---|---|
| CN | 101150842 A | 3/2008 |
| CN | 101626596 A | 1/2010 |
| CN | 101784044 A | 7/2010 |
| CN | 101888678 A | 11/2010 |
| CN | 102164389 A | 8/2011 |
| CN | 102215530 A | 10/2011 |
| EP | 2 541 985 A1 | 1/2013 |
| KR | 20100087821 A | 8/2010 |

\* cited by examiner

*Primary Examiner* — Diane Mizrahi
(74) *Attorney, Agent, or Firm* — Brinks Gilson & Lione

(57) ABSTRACT

The present invention discloses a method for accessing s network system, including the following steps: receiving, by a first network device of a first network system, a measurement report of a second network system sent by a user equipment of the first network system; determining, by the first network device, a second network device in the second network system according to the measurement report; and sending, by the first network device, a bearer setup request to the second network device, for enabling the second network device to set up a connection with the user equipment. The present invention, by realizing aggregation between a two network systems, may dynamically schedule the resources of the two network systems according to loads of the two network systems, thereby provides load balancing with extremely high efficiency, and is capable of increase the peak data rate of the user effectively and remarkably.

21 Claims, 6 Drawing Sheets

USER EQUIPMENT, NETWORK DEVICE AND METHOD FOR ACCESSING NETWORK SYSTEM

CROSS-REFERENCE TO RELATED APPLICATIONS

This application is a continuation of International Patent Application No. PCT/CN2013/080246, filed on Jul. 27, 2013, which claims priority to Chinese Patent Application No. 201210268408.8, filed on Jul. 31, 2012, both of which are hereby incorporated by reference in their entireties.

TECHNICAL FIELD

The present invention relates to the technical field of wireless communications, and particularly, to a user equipment, a network device and a method for accessing network system.

BACKGROUND

In order to meet the challenges of wireless broadband technology and keep the pioneering advantages of the third generation partnership project (The 3rd Generation Partnership Project, 3GPP) network, the 3GPP developed a long term evolution (Long Term Evolution, LTE) scheme at the end of 2004. A new mobile communication network architecture is defined under the guidance of the evolution scheme, the architecture only retains a packet switched (Packet Switched, PS) domain, and thus the architecture is called an evolved packet system (corresponding English full title is Evolved Packet System, EPS or System Architecture Evolution, SAE). The architecture of an LTE system is shown in FIG. 1, wherein a serving GPRS support node SGSN (Serving GPRS SUPPORT NODE) is an important part of a core network packet domain device, a home subscriber server HSS (Home Subscriber Server) is an important part of a central control layer, a GSM and EDGE radio access network GERAN (GSM EDGE Radio Access Network) and a global universal terrestrial radio access network UTRAN (Universal Terrestrial Radio Access) provide a radio access manner respectively, an evolved universal terrestrial radio access network E-UTRAN (Evolved Universal Terrestrial Radio Access Network) is an evolved base station eNB and is responsible for modulating and demodulating data. A serving gateway (Serving Gateway) and a packet data network gateway (Packet Data Network Gateway) are evolved gateways, and are responsible for forwarding data packets. A mobility management entity (Mobility Management Entity) is a signaling control entity of an evolved system and is responsible for such functions as authentication, mobility management and the like, a policy and charging rules function PCRF (Policy and Charging Rules Function) is a decision point of the service data flows and IP bearer resources policy and the charging control policy. An evolved network does not provide a traditional circuit-switched voice function, but only provides a high rate data bearer service. As shown in FIG. 1, the evolved system may further support intercommunication between the third generation universal terrestrial radio access network (Universal Terrestrial Radio Access Network) of the 3GPP and the 2.5th generation radio access network (GSM (GPRS)/EDGE Radio Access Network) of the 3GPP.

As shown in FIG. 2, the third generation partnership project (The 3rd Generation Partnership Project) and the third generation partnership project 2 (3GPP2) further define an intercommunication standard of a service between an LTE (Long Term Evolution) network and a CDMA (Code Division Multiple Access) high rate packet data (High Rate Packet Data, HRPD) network, and support the CDMA HRPD network to access an evolved packet core network (Evolved Packet Core, EPC) and to switch data services.

In the prior art, under the intercommunication architecture of packet data services between the above-mentioned LTE network and the CDMA HRPD network, a user equipment (User Equipment, UE) may switch between two networks, however, the user equipment may only implement the data services in one system (LTE or CDMA HRPD) at one moment, so that the network resources could not be fully utilized, and a data rate of a user is low.

SUMMARY

The present invention provides a method for accessing a network system, including the following steps:

receiving, by a first network device of a first network system, a measurement report of a second network system sent by a user equipment of the first network system;

determining, by the first network device, a second network device in the second network system according to the measurement report; and sending, by the first network device, a bearer setup request to the second network device, for enabling the second network device to set up a connection with the user equipment.

Optionally, the measurement report comprises carrier information of the second network system, and the carrier information comprises carrier frequency information and carrier signal strength information or carrier signal quality information.

Optionally, the determining a second network device in the second network system comprises:

selecting, by the first network device, a network device corresponding to a carrier with strongest signal strength or best signal quality in the second network system as the second network device, according to the carrier information.

Optionally, the bearer setup request includes related information of the user equipment.

Optionally, after receiving the measurement report, the first network device determines whether a service is processed by the first network system, or processed by the second network system, or co-processed by the first network system and the second network system, according to a QoS requirement of the service and carrying capacity or load situations of the first network system and the second network system.

When determining that the service is processed by the second network system, or co-processed by the first network system and the second network system, requesting, by the first network device, the second network device to set up a corresponding radio bearer for bearing the service according to the QoS requirement of the service.

After setting up the radio bearer, the first network device stores a mapping relation between the bearer set up for the first network system and/or the second network system and the service.

Optionally, the first network device sets up a bearer between the first network device and the second network device according to the radio bearer set up by the second network device.

Optionally, after setting up the connection with the user equipment by the second network device, the first network device receives a bearer setup response sent by the second network device.

Optionally, after setting up the bearer between the first network device and the second network device, the first network device determines whether the second network device quits a service related to the user equipment or modifies a beared service, according to a received latest measurement report and/or the QoS requirement of the service.

Optionally, the measurement report is sent to the first network device by the user equipment when carrier information of the second network system meets a preset trigger condition, or is sent to the first network device by the user equipment based on a request from the first network device.

The present invention provides a network device, configured to access a user equipment to a core network of a first network system, including:

a receiver, configured to receive a measurement report of a second network system sent by the user equipment;

a processor, configured to find out a second network device of the second network system according to the measurement report; and a sender, configured to send a bearer setup request to the second network device, for enabling the second network device to set up a connection with the user equipment; wherein the bearer setup request comprises related information of the user equipment.

Optionally, the receiver is further configured to, after the second network device sets up the connection with the user equipment, receive a bearer setup response message sent by the second network device.

Optionally, the processor is further configured to, after the second network device sets up the connection with the user equipment, for a service related to the user equipment, determine whether the service is processed by the first network system, or processed by the second network system, or co-processed by the first network system and the second network system, according to a QoS requirement of the service and carrying capacity or load situations of the first network system and the second network system.

Optionally, the processor is further configured to, when determining that the service is processed by the second network system, or co-processed by the first network system and the second network system, generate a second network system bearer setup request according to the QoS requirement of the service, for enabling the second network device to set up a corresponding radio bearer for bearing the service.

Optionally, the processor is further configured to, in accordance with the radio bearer set up by the second network device, set up a corresponding bearer between the network device and the second network device.

Optionally, the processor is further configured to, after setting up the bearer between the first network device and the second network device, determine whether the second network device quits the service related to the user equipment or modifies the beared service, according to a received latest measurement report and/or the QoS requirement of the service.

The present invention further provides a network device, located in a second network system, including:

a receiver, configured to receive a bearer setup request from a first network device, wherein the bearer setup request comprises related information of a user equipment in a first network system; and a processor, configured to set up a connection with the user equipment according to the related information of the user equipment, and set up a bearer used for bearing a service of the user equipment according to the bearer setup request.

The network device may further include:

a sender, configured to send a bearer setup response to the first network device after the connection is set up.

Optionally, the sender is further configured to send a paging message to the user equipment, for enabling the network device to set up a connection with the user equipment.

Optionally, the receiver is further configured to receive a request message sent by the user equipment, and set up the connection with the user equipment.

Optionally, the receiver is further configured to receive a bearer deactivation request or a bearer modification request sent by the first network device; the processor disconnects or releases the connection with the user equipment according to the bearer deactivation request, and the processor modifies the bearer set up with the user equipment according to the bearer modification request.

The present invention provides a user equipment, connected in a first network system, including:

a sending unit, configured to send a measurement report of a second network system to a first network device of a first network system, for enabling the first network device to send a bearer setup request to a second network device and set up a connection with the second network device according to the measurement report; and a second connection setup unit, configured to set up the connection with the second network device.

Optionally, the user equipment further includes:

a detecting unit, configured to detect a signal of the second network system and generate a measurement report.

The user equipment may further include:

a receiving unit, configured to receive paging information sent by the second network device, the second connecting unit sets up the connection with the second network device according to the paging information, wherein the paging information is generated by the second network device according to the bearer setup request.

Or, a receiving unit, configured to receive a connecting instruction sent by the first network device, wherein the connecting instruction is corresponding to setting up the connection with the second network device; and a second sending unit, configured to send connection request information to the second network device according to the connecting instruction.

The user equipment may further include:

a setting unit, configured to preset a trigger condition, and the sending unit sends the measurement report to the first network device when the measurement report meets the trigger condition.

The present invention makes a user equipment enable to receive and send data in two network systems simultaneously by realizing aggregation between the two network systems, and solve solving the technical problems of fully utilizing network resources and improving a data rate of a user. The present invention may dynamically schedule the resources of the two network systems according to loads of the two network systems, thereby provides load balancing with extremely high efficiency, and is capable of increase the peak data rate of the user effectively and remarkably. In addition, the system and the method of the present invention make the resources of the two network systems be utilized by aggregation without handover between the two network systems, so that signaling procedures may be reduced and the risk of handover failure is lowered.

DESCRIPTION OF EMBODIMENTS

Figure 1:
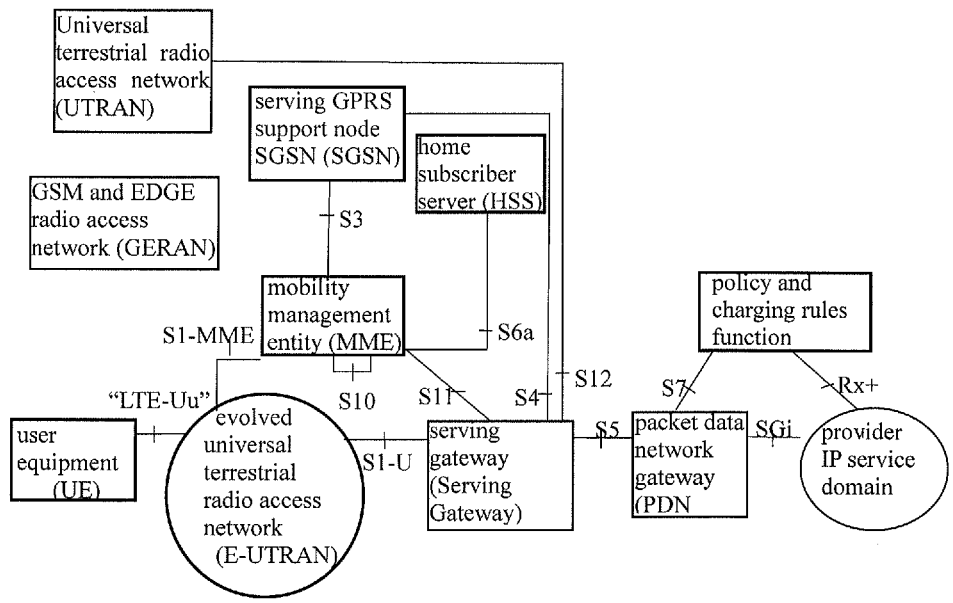
FIG. 1 is a 3GPP evolved network architecture under a non-roaming condition.
Figure 2:
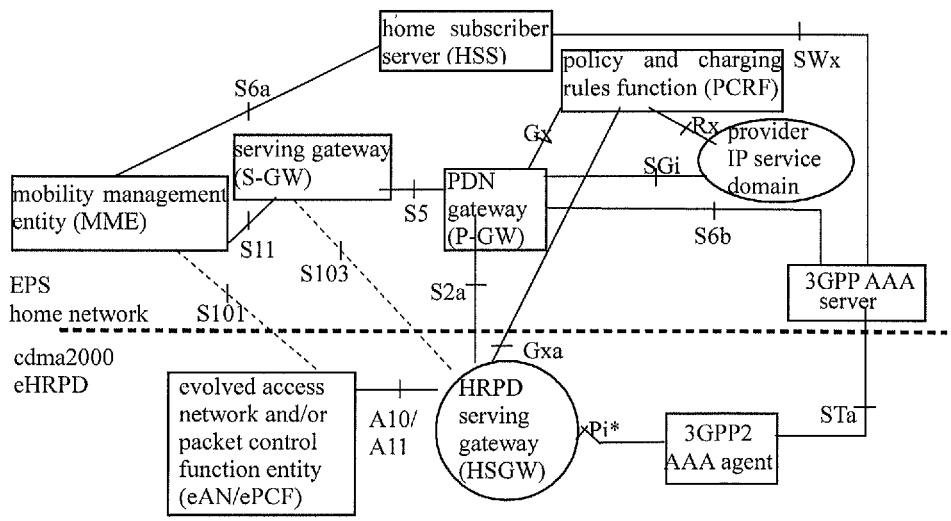
FIG. 2 is a network architecture of packet service intercommunication of LTE and CDMA HRPD.
Figure 3:
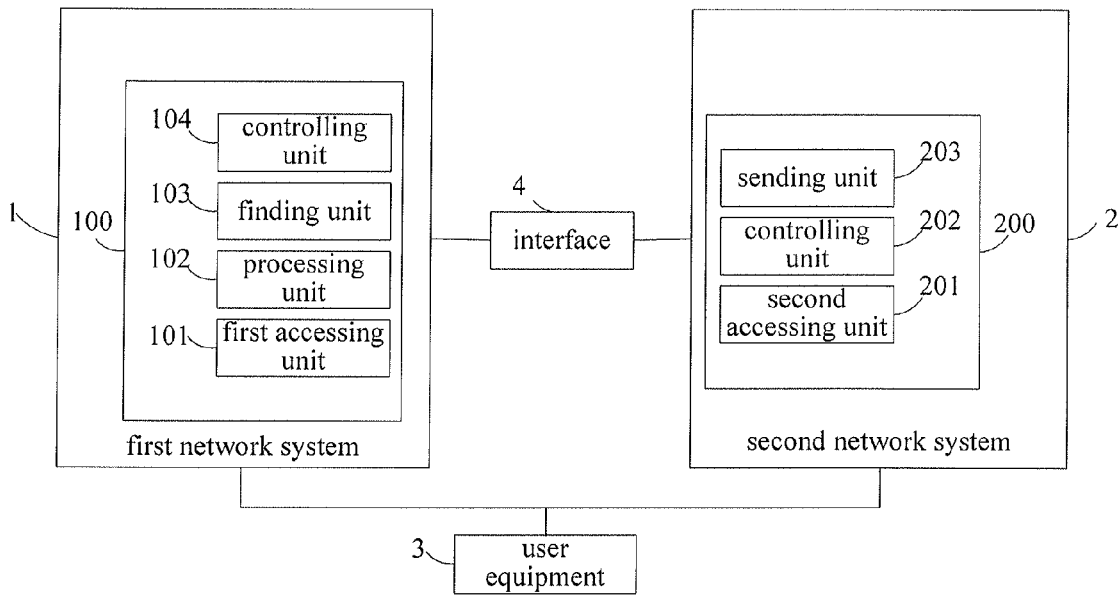
FIG. 3 is a block diagram of a structure of a carrier aggregation system.

A network device and a method for accessing a network system provided by the present invention are illustrated in detail below, in combination with the accompanying drawings and embodiments:

FIG. 3 shows a structure of aggregating two network systems, wherein a device 100 is a network device of a first network system 1, a device 200 is a network device of a second network system 2, and the device 100 and the device 200 may perform information interaction through an interface 4.

The device 100 receives a measurement report sent by a user equipment 3 in the first network system 1, wherein the measurement report contains carrier information of the second network system 2;

optionally, the carrier information includes information of frequency of a carrier in the second network system 2 or of signal strength or signal quality of the carrier, or the like;

the device 100 finds out the network device (namely the device 200) of the second network system 2 according to the carrier information of the second network system 2 in the measurement report;

the device 100 sends a bearer setup request to the device 200, for enabling the device 200 to set up a connection with the user equipment 3; wherein the bearer setup request includes related information of the user equipment 3.

The manner in which the device 200 sets up the connection with the user equipment 3 includes:

(1) the device 200 sends a paging message to the user equipment 3, for enabling the user equipment 3 to access the device 200; or (2) the user equipment 3 sends a request message to the device 200, for requesting to access the device 200.

By the above-mentioned system, the user equipment 3 located in an overlapped coverage range of the two network systems may receive or send data in the two systems simultaneously, the data received and sent by the first network system and the second network system is aggregated at the first network device, in this way, the user equipment may use the bandwidths of the resources of the two networks simultaneously, thus the data transmission rate of the user is increased.

Further, after the device 200 sets up the connection with the user equipment 3, the device 200 may send a bearer setup response to the device 100, and the device 100 receives the bearer setup response sent by the device 200.

Further, after the device 200 sets up the connection with the user equipment 3, may further include: for a service related to the user equipment 3, the device 100 determines whether the service is processed by the first network system 1, or processed by the second network system 2, or co-processed by the first network system 1 and the second network system 2, according to a QoS requirement of the service and carrying capacity or load situations of the first network system and the second network system.

Further, when determining that the service is processed by the second network system 2, or co-processed by the first network system 1 and the second network system 2, the device 100 may further request the device 200 to set up a corresponding radio bearer in the second network system 2 for bearing the service, according to the QoS requirement of the service.

For the radio bearer set up by the device 200, the device 100 may further set up a corresponding bearer between the device 100 and the device 200 through the interface 4.

Specifically, the above-mentioned device 100 may include a receiver, a processor and a sender:

the receiver is configured to receive a measurement report sent by the user equipment 3 in the first network system 1, wherein the measurement report includes carrier information of the second network system 2;

optionally, the carrier information may include information of frequency of a carrier in the second network system 2 or of signal strength or signal quality of the carrier or the like;

the processor is configured to find out the network device (namely the device 200) of the second network system 2 according to the carrier information of the second network system 2 in the measurement report;

the sender is configured to send a bearer setup request to the device 200, for enabling the device 200 to set up a connection with the user equipment 3; wherein the bearer setup request includes related information of the user equipment 3.

Optionally, the receiver is further configured to, after the device 200 sets up the connection with the user equipment 3, receive a bearer setup response message sent by the device 200.

Optionally, the processor is further configured to, after the device 200 sets up the connection with the user equipment 3, for a service related to the user equipment 3, determine whether the service is processed by the first network system 1, or processed by the second network system 2, or co-processed by the first network system 1 and the second network system 2, according to a QoS requirement of the service and carrying capacity or load situations of the first network system and the second network system.

Optionally, the processor is further configured to, when determining that the service is processed by the second network system 2, or co-processed by the first network system 1 and the second network system 2, request the device 200 to set up a corresponding radio bearer in the second network system for bearing the service, according to the QoS requirement of the service.

Optionally, the processor is further configured to, for the radio bearer set up by the device 200, set up a corresponding bearer between the device 100 and the device 200 through the interface 4.

Specifically, the device 200 includes:

an interface unit, configured to match with an interface of a first network device of a first network, and configured to receive a bearer setup request from the first network device, wherein the bearer setup request contains related information of a user equipment in a first network system;

a processor, configured to set up a connection with the user equipment 3 according to the related information of the user equipment 3;

optionally, the sender is further configured to, after the connection is set up, send a bearer setup response to the first network device;

optionally, the processor is further configured to, set up a radio bearer in the second network system 2 for bearing the service of the user equipment 3 according to the request of the device 100.

As another implementation, the device 100 may further include the following structure:

a first accessing unit 101, configured to make a user equipment 3 to access in a core network of a first network system;

a receiving unit, configured to receive a measurement report of a second network system sent by the user equipment;

a finding unit, configured to find out a second network device of the second network system according to the measurement report;

a processing unit, configured to generate a bearer setup request according to the measurement report and information of the second network device;

a sending unit 105, configured to connect with the second network device, and configured to send the bearer setup request to the second network device, for enabling the second network device to set up a connection with the user equipment; wherein the bearer setup request includes related information of the user equipment.

Optionally, the device 100 may further include:

a selecting unit 102, configured to select a network device about to set up a bearer from the second network system 2 according to the measurement report of the second network system 2 as the second network device;

optionally, the device 100 may further include:

a service allocation unit 103, configured to, for a service related to the user equipment, determine whether the service is processed by the first network system, or processed by the second network system, or co-processed by the first network system and the second network system, according to a QoS requirement of the service and carrying capacity or load situations of the first network system and the second network system;

optionally, the device 100 may further include:

a controlling unit 104, configured to, for the radio bearer set up by the second network device, set up a corresponding bearer between the network device and the second network device.

The controlling unit is further configured to, regulate the bearer in the second network system in real time according to the measurement report and QoS control information, including: enabling the bearer having been set up in the second network system to quit the service of the user equipment, or setting up a new bearer through another second network device.

As another specific implementation, the second network device 200 includes:

a first sending/receiving unit, configured to receive a bearer setup request from a first network device, wherein the bearer setup request contains related information of a user equipment in a first network system;

a controlling unit, configured to set up a connection with the user equipment according to the related information of the user equipment, and set up a radio bearer for bearing a service of the user equipment according to the bearer setup request.

A second sending/receiving unit, configured to transmit information with the user equipment.

The first sending/receiving unit is further configured to forward downlink data (the data is service data beared by the second network system 2) sent from the first network device 100 to the user equipment 3, and uplink data (the data is service data beared by the second network system 2) sent from the user equipment 3 to the first network device 100.

The controlling unit is further configured to disconnect the connection between the sending/receiving unit and the user equipment according to a bearer modification request sent by the first network device 100.

It should be noted that, in the present embodiment, the first network system and the second network system may be any 3G network system or 4G network system, and the corresponding first network device and the second network device are the network devices of the two systems respectively.

The invention further provides a user equipment, which is connected in a first network system, includes:

a detecting unit, configured to detect at least one signal of a second network system and generate a measurement report;

a sending unit, configured to send the measurement report to a first network device of the first network system, wherein the measurement report is used as the foundation of the first network device for sending a bearer setup request to a second network device; and a second connection setup unit, configured to set up a connection with the second network device.

The user equipment may further include:

a receiving unit, configured to receive paging information sent by the second network device, the second connecting setup unit sets up the connection with the second network device according to the paging information, wherein the paging information is generated by the second network device according to the bearer setup request.

Or, may further include:

a receiving unit, configured to receive a connecting instruction sent by the first network device, wherein the connecting instruction is corresponding to a request for setting up the connection with the second network device; and a second sending unit, configured to send connection setup information to the second network device according to the connecting instruction.

The user equipment may include:

a setting unit, configured to preset a trigger condition, and the sending unit sends the measurement report to the first network device when the measurement report meets the trigger condition.

The present invention further provides a method for accessing a network system, the method includes:

S1. a first network device of a first network system receives a measurement report sent by a user equipment of the first network system;

S2. the first network device determines a second network device of a second network according to the measurement report; and S3. the first network device sends a bearer setup request to the second network device, for enabling the second network device to set up a connection with the user equipment.

Optionally, the measurement report contains carrier information of the second network system, wherein the carrier information includes carrier frequency information and carrier signal strength information or signal quality information in the second network system, and the bearer setup request includes related information of the user equipment.

Wherein the step S3 may be implemented in the following manner:

the second network device sends a paging message to the user equipment, for enabling the user equipment to access the second network device; or the user equipment sends a request message to the second network device, for requesting to access the second network device.

After receiving the measurement report, for a service performed by the user equipment, the first network device determines whether the service is processed by the first network system, or processed by the second network system, or co-processed by the first network system and the second network system, according to a QoS requirement of the service and carrying capacity or load situations of the first network system and the second network system.

When determining that the service is processed by the second network system or co-processed by the first network system and the second network system, the first network device requests the second network device to set up a corresponding radio bearer in the second network system for bearing the service, according to the QoS requirement of the service.

When determining that the service is processed by the second network system or co-processed by the first network system and the second network system, the first network device stores a mapping relation between the bearer set up for the first network system and/or the second network system and the service.

According to the radio bearer set up by the second network device, the first network device sets up a bearer between the first network device and the second network device.

After the second network device sets up the connection with the user equipment, may further include: the second network device sends a bearer setup response to the first network device, and the first network device receives the bearer setup response sent by the second network device.

Before the step S2, may further include:

a trigger condition is preset in the user equipment 3, and the user equipment 3 actively sends the measurement report of the second network system 2 to the first network device when the carrier information of the second network system 2 meets the trigger condition. Or the user equipment 3 sends the measurement report of the second network system 2 to the first network device based on the request of the first network device 100.

The working process of the first network device and the second network device will be described in detail below:

the user equipment 3 in the first network system 1 sends the measurement report to the device 100, wherein the measurement report includes carrier information of the second network system 2;

the trigger condition may be preset in the user equipment 3, the user equipment 3 actively sends the measurement report including the carrier information of the second network system 2 to the device 100 when the carrier information of the second network system 2 meets the trigger condition. Or the user equipment 3 sends the measurement report of the second network system 2 to the first network device based on the request of the first network device 100.

The device 100 finds out the network device (namely device 200) of the second network system 2 according to the carrier information of the second network system 2 in the measurement report, and sends the related information of the user equipment 3 to the device 200, for enabling the device 200 to set up a connection with the user equipment 3.

The first network device 100 determines whether the user equipment is accessed to the second network system according to the measurement report of the second network system 2 and a signal condition of the second network system. In the case that the user equipment is accessed to a certain network device of the second network system, the first network device may control the user equipment to quit the second network system or control the user equipment to connect with other user equipment in the second network system.

Wherein, the user equipment 3 monitors the measurement report of the second network system 2 in real time or periodically, may send the measurement report of the second network system 2 to the first network device 100 according to the request of the first network device 100. the trigger condition may also be preset in the user equipment 3, and the user equipment 3 actively sends the measurement result to the first network device 100 when a network measurement result of the second network system 2 meets the trigger condition.

Further, the first network device 100 selects a network device meeting a first preset condition (for example, signal strength is higher than a preset threshold or signal quality is higher than a preset threshold) as the second network device, according to the measurement report fed back by the user equipment 3, and generates a bearer setup request. Wherein, the bearer setup request may include information of a network device about to participate in or quit aggregation, service information allocated by the first network device 100 for the second network system 2, a aggregation QoS parameter and the like, for enabling the first network device 100 to implement controlling the aggregation QoS and aggregating and modifying user plane data.

The step of generating the bearer setup request further includes:

the first network device 100 selects a network device according to the measurement report;

the first network device 100 allocates services beared by the first network system 1 and the second network system 2 respectively according to information of the network device;

the first network device 100 performs a step of converting a QoS parameter related to the service allocated to the second network system (the step is optional, and the conversion of the QoS parameter may also be implemented by the second network device);

the first network device 100 sends the generated bearer setup request and the QoS parameter to the second network device 200.

In addition, the second network device 200 accesses the user equipment 3 to the second network system 2 according to the bearer setup request sent by the first network device 100, and sets up a bearer in the second network system 2 according to the QoS parameter, namely sets up an air interface connection for bearing corresponding service, and the second network device 200 feeds back the information that the bearer has been set up to the first network device.

After the second network device 200 sends feedback information to the first network device 100, the first network device 100 updates the original bearer connection with the user equipment 3 according to the mapping relation between a new service after participating in the aggregation by the second network system 2 and the bearer.

At this time, the user equipment 3 may receive and send data in the first network system 1 and the second network system 2 simultaneously. The second network device 200 forwards downlink data sent from the first network device 100 to the user equipment 3 and uplink data sent from the user equipment 3 to the first network device 100 through the second network system 2, according to the mapping relation between the service and the bearer and QoS control information.

In the transmission process of the above-mentioned downlink data and the uplink data, if the first network device 100 judges that the second network system 2 could not meet a second preset condition (for example, the carrier signal strength is lower than a preset threshold or the carrier signal quality is lower than a preset threshold) according to the measurement report including the carrier information, the first network device updates the mapping relation between the service and the bearer, and transmits the updated mapping relation between the service and the bearer to the second network device 200 through the interface between the first network device and the second network device 200 in real time, and the second network device 200 modifies the bearer according to the updated mapping relation between the service and the bearer.

In the transmission process of the above-mentioned downlink data and the uplink data, if the first network device 100 judges that the second network system 2 could not meet a third preset condition (for example, the carrier signal strength or the carrier signal quality is lower than a minimal threshold requirement) according to the measurement report including the carrier information, the first network device controls a target carrier to quit the carrier aggregation of the user equipment 3 having accessed the first network system 1 in real time. For example, the first network device 100 may send a bearer deactivation request to the second network device 200, and the second network device 200 disconnects the connection with the user equipment 3 according to the bearer deactivation request or releases the radio resource control protocol RRC connection with the user equipment, so as to enable the target carrier to quit the aggregation.

Figure 4:
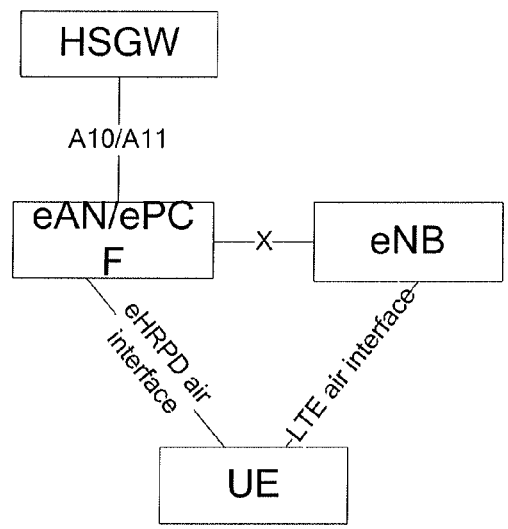
FIG. 4 is a system architecture of a carrier aggregation system of a first implementation.

FIG. 4 shows an aggregation system, in the aggregation system, a first network device is an evolved access network and/or packet control function entity (eAN/ePCF), a first network system is an evolved high rate packet data (eHRPD) network system, a second network device is an evolved Node B (eNB), and a second network system is an LTE network system. The eAN/ePCF and the eNB interact through a first interface X, the first interface X is responsible for the interaction of QoS control information and modification information (including a mapping relation between a service and a bearer, carrier measurement information, and such control commands as carrier addition, modification, deletion and the like) between the eAN/ePCF and the eNB, and is also responsible for the data interaction between the eAN/ePCF and the eNB. The transmission protocol stack of a control plane of the X interface is shown in the following table:

| X Application |
| --- |
| UDP |
| IP |
| Link Layer |
| Physical Layer |

For a data plane interface of the X interface, a mechanism the same as that of the A10 interface of an eHRPD system is adopted, to support a plurality of data plane connections, namely, different data plane connections are distinguished by adopting a GRE key manner. IP flows of the same QoS requirements are beared on the same data plane.

The eAN/ePCF interacts with a user equipment through an eHRPD air interface, besides supporting the original functions of the eAN/ePCF, the eAN/ePCF further achieves functions of QoS control of carrier aggregation and aggregation and modification of user plane data, determines the mapping relation between the service and the bearer, and selects a proper service to be beared on the two network systems.

The eNB interacts with the user equipment through an LTE air interface, besides the original functions, the eNB further supports signaling interaction with the eAN/ePCF, sets up a bearer of the LTE system according to a requirement of the eAN/ePCF, and meanwhile supports to forward downlink data sent from the eAN/ePCF to the user equipment and uplink data sent from the UE to the eHRPD network system in the LTE system.

An HRPD serving gateway HSGW (HRPD Serving Gateway) is an access gateway of an eHRPD network, the interface of the eAN/ePCF and the HSGW is an A10/A11 interface of the eHRPD network system, and the other parts in the eHRPD network system are not shown.

Figure 5:
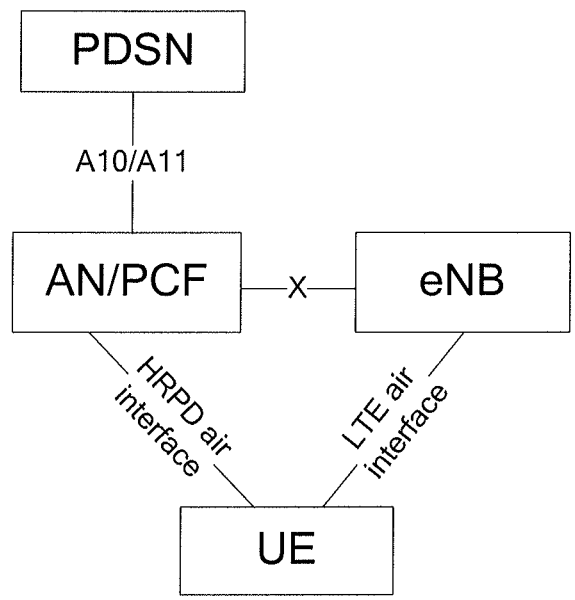
FIG. 5 is a system architecture of a carrier aggregation system of a second implementation.
Figure 6:
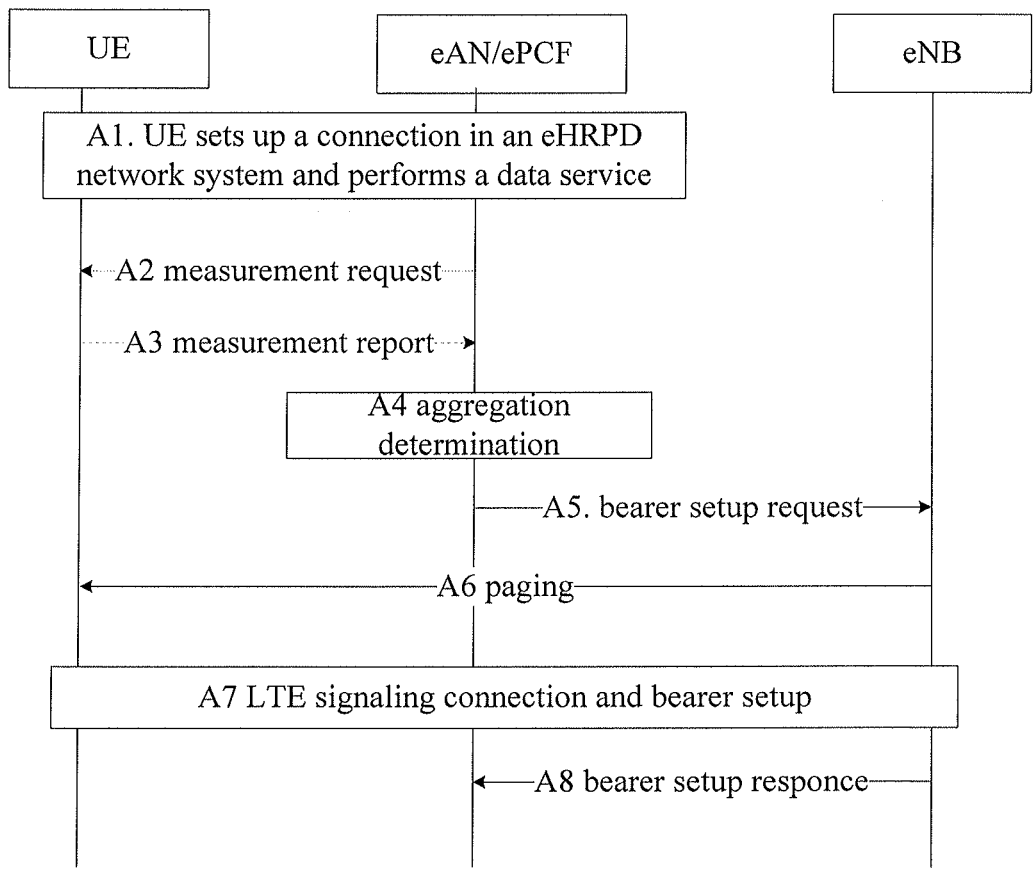
FIG. 6 to FIG. 7 are sequence diagrams of carrier aggregation methods corresponding to the system architectures as shown in FIG. 4 and FIG. 5.

FIG. 5 shows an aggregation system of another implementation, in the aggregation system, a first network device is an access network and/or a packet control function entity (AN/PCF), a first network system is a high rate packet data (HRPD) network system, a second network device is an eNB, and a second network system is an LTE network system. The functions implemented by the AN/PCF are the same as those of the eAN/ePCF in FIG. 4, and a PDSN is an access gateway of an HRPD network. The other parts and corresponding functions in this system are the same as those of corresponding parts in FIG. 4, and will not be repeated redundantly herein.

The present invention further provides a specific implementation of a carrier aggregation method, the method includes the following steps:

A1. a user sets up a connection in an eHRPD network system through an eAN/ePCF, and performs a data service.

A2. the eAN/ePCF sends a measurement request of carriers of a possible cooperation LTE network system to a user equipment.

A3. the user equipment reports a measurement report including carrier information of the LTE network system to the eAN/ePCF.

A4. the eAN/ePCF selects a target carrier participating in aggregation according to a carrier measurement result of the LTE network system reported by the user equipment, for example, selecting a carrier with strongest signal strength in the policy report as the target carrier, and determining an eNB of the corresponding LTE system according to the frequency and physical cell identifier of the target carrier. The eAN/ePCF allocates a service beared by the eHRPD network system and the LTE network system, converts a QoS parameter (converting the QoS parameter generated by the eHRPD into an LTE QoS parameter capable of being identified by the eNB, and the conversion may also be implemented by the eNB), and generates a bearer setup request.

A5. the eAN/ePCF sends the bearer setup request (including a QoS control requirement and target carrier information) to the eNB, and appoints a target carrier needed to be coopreated to the eNB, or the eNB selects one cooperation target carrier from the target carriers. In this step, traffic flow template (TFT) information negotiated by the user equipment and an HSGW is obtained from the HSGW. The HSGW transmits the TFT information to the eAN/ePCF by using an A11-session update (Session Update) signaling. The eAN/ePCF sends the selected LTE system target carrier to the UE through an eHRPD air interface, the UE monitors a paging channel of the target carrier, and waits for the paging of LTE or actively initiates a connection process with the LTE network system.

A6. the eNB initiates a process of accessing the user equipment to the LTE network system through a paging message. Or, the user equipment actively initiates the process of accessing the LTE network system according to the target carrier information sent by the eHRPD network.

A7. the eNB sets up a signaling connection and a bearer with the user equipment in the LTE network system. In this process, an authentication process may not be implemented between the UE and the eNB.

A8. the eNB finally feeds back the information that the bearer has been set up to the eAN/ePCF, including the data plane connection information corresponding to the LTE air interface bearer set up. The eNB maintains a mapping relation between the LTE air interface radio bearer and an X interface data plane connection. The eAN/ePCF maintains a mapping relation between the X interface data plane connection and an A10 connection.

Thereafter, the user equipment may send and receive data in the LTE network system and the eHRPD network system simultaneously.

Figure 7:
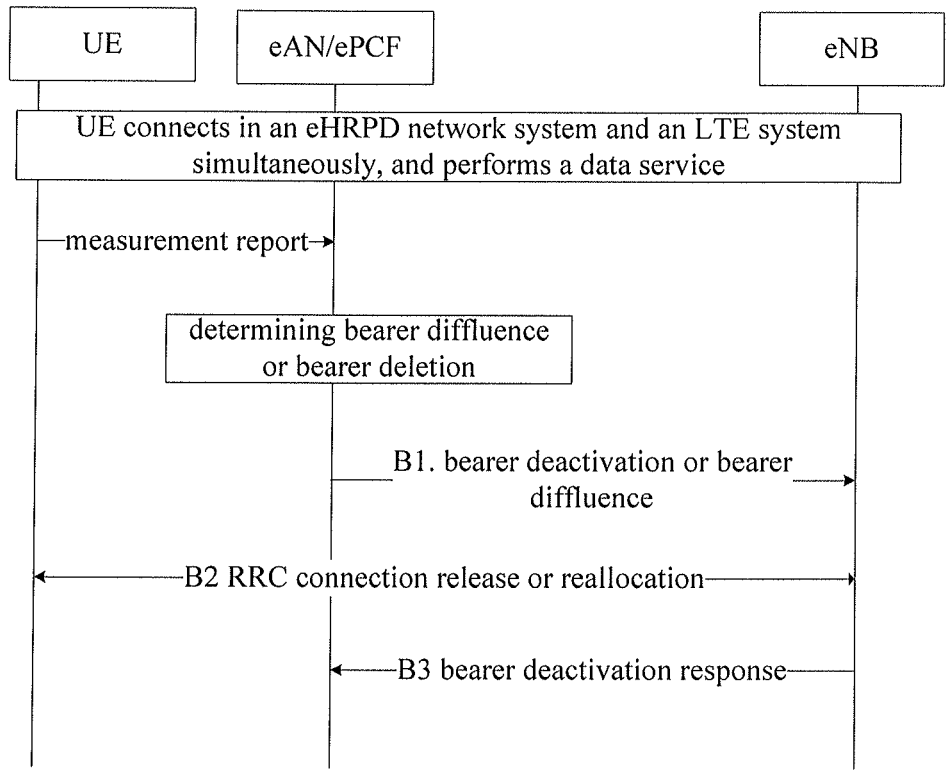

In the process that the user equipment may send and receive data in the LTE network system and the eHRPD network system simultaneously, the eAN/ePCF may modify and delete the bearer according to the carrier information of the LTE network system at any time, in order to enable the target carrier to quit carrier aggregation, specifically, as shown in FIG. 7, including the following steps:

B1. when the LTE network system does not meet a second preset condition, the eAN/ePCF updates the mapping relation between the service and the bearer and requests the eNB to implement bearer modification, and when the LTE network system does not meet a third preset condition, the eAN/ePCF sends a bearer deactivation request to the eNB and requests to delete the bearer of the LTE network system.

B2. the eNB and the user equipment implement an RRC connection release process to delete the bearer of the LTE network system, so as to enable the target carrier to quit the carrier aggregation, and if only a part of bearer is modified, the eNB and the user equipment implement an RRC connection reallocation process.

B3. after the eNB and the user equipment implement the RRC connection release, the eNB feeds back the information that the bearer has been deactivated to the eAN/ePCF.

Figure 8:
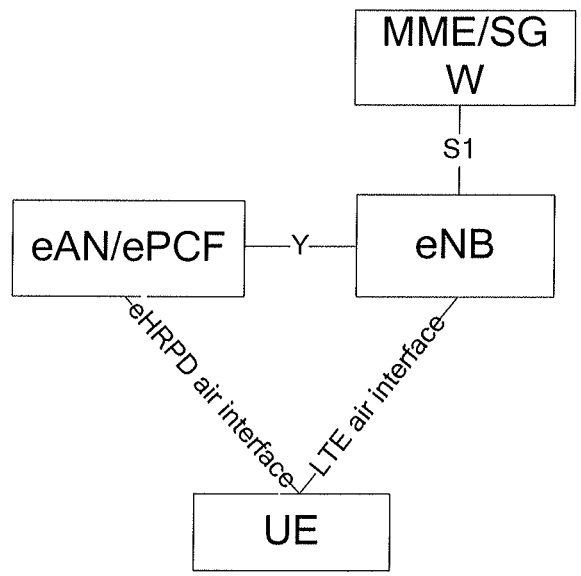
FIG. 8 is a system architecture of a carrier aggregation system of a third implementation.

As shown in FIG. 8, in the carrier aggregation system of the present invention, a first network device is an eNB, a first network system is an LTE network system, a second network device is an eAN/ePCF, a second network system is an eHRPD network system, the eNB and the eAN/ePCF interact through a second interface Y, the functions implemented by the second interface Y include: QoS control and modification information interaction between the eNB and the eAN/ePCF; and bearing of downlink data sent from the eNB to the LTE network system and uplink data sent by the user equipment from the eHRPD network system to the LTE network system. The transmission protocol stack of a control plane of the Y interface is shown in the following table:

| Y Application |
|---|
| UDP |
| IP |
| Link Layer |
| Physical Layer |

For a data plane interface of the Y interface, a mechanism the same as that of the A10 interface of an eHRPD system is adopted, to support a plurality of data plane connections, namely, different data plane connections are distinguished by adopting a GRE key manner. IP flows of the same QoS requirements are beared on the same data plane.

The eNB interacts with the user equipment through an LTE air interface, besides the original functions, the eNB further achieves functions of QoS control of carrier aggregation and aggregation and modification of user plane data, determines the mapping relation between the service and the bearer, and selects a proper service to be beared on the two network systems.

The eAN/ePCF interacts with the user equipment through an eHRPD air interface, besides supporting the original functions of the eAN/ePCF, the eAN/ePCF further supports signaling interaction with the eNB, sets up a bearer of the eHRPD network according to a requirement of the eNB, and meanwhile supports to forward downlink data sent from the eNB to the user equipment and uplink data sent from the user equipment to the eNB through the eHRPD network in the eHRPD network.

A mobility management entity MME (Mobility Management Entity) and a serving gateway SGW (Serving Gateway) are network elements of a core network. The interface of the eNB and the MME/SGW is an S1 interface.

Figure 9:
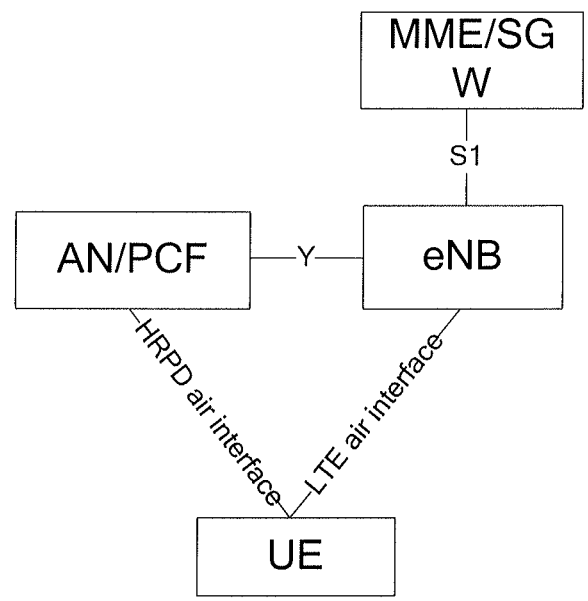
FIG. 9 is a system architecture of a carrier aggregation system of a fourth implementation.

As shown in FIG. 9, in the carrier aggregation system of this embodiment, a second network device is an AN/PCF, a second network system is an HRPD network system, the other parts and corresponding functions in the system are the same as the illustration of FIG. 8, and will not be repeated redundantly herein.

Figure 10:
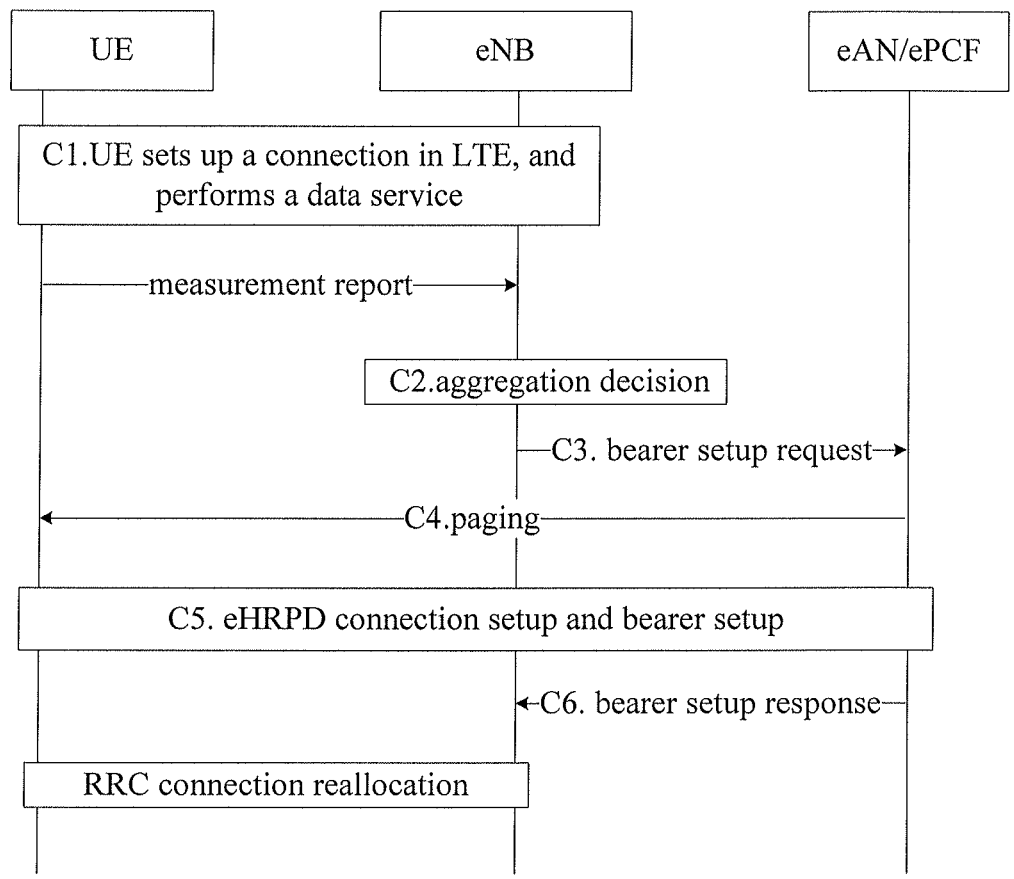
FIG. 10 to FIG. 11 are sequence diagrams of carrier aggregation methods corresponding to the system architectures as shown in FIG. 8 and FIG. 9.

The present invention further provides another specific implementation of a carrier aggregation method, as shown in FIG. 10, the method includes the following steps:

C1. a user sets up a connection (an eNB sets up an RRC connection with user equipment) in an LTE network system through the eNB, and performs a data service.

C2. the eNB selects a target carrier participating in aggregation according to a carrier measurement result of an eHRPD network system reported by the user equipment, for example, determining carrier with strongest signal in the measurement report as the target carrier, and determining an eAN/ePCF of a corresponding eHRPD network according to a carrier frequency and pilot bias. The eNB allocates services beared by the LTE network system and the eHRPD network system, determines the mapping relation between the allocated services and the bearer, converts a QoS parameter (converting an LTE QoS parameter into an eHRPD QoS parameter capable of being identified by the eAN/ePCF, and the QoS conversion may also be implemented by the eAN/ePCF), and generates a bearer setup request.

C3. the eNB sends the bearer setup request (including a QoS control requirement and the mapping relation between the service and the bearer) to the eAN/ePCF, and appoints a target carrier needed to be cooperated to the eAN/ePCF. The eNB sends the selected eHRPD system target carrier to the UE through an LTE air interface, the UE monitors a paging channel of the target carrier, and waits for the paging of eHRPD or actively initiates a connection process with the eHRPD network system.

C4. the eAN/ePCF initiates a process of accessing the user equipment to the eHRPD network system through a paging message. Or, the user equipment actively initiates the process of accessing the eHRPD network system according to the target carrier information sent by the eNB.

C5. the eAN/ePCF sets up an air interface connection and a bearer with the user equipment in the eHRPD network system. An access network authentication process may be omitted.

C6. the eAN/ePCF finally feeds back the information that the bearer has been set up to the eNB, including the data plane connection information corresponding to the eHRPD air interface bearer set up. The eNB performs RRC connection reallocation, in this process, the eNB may notify the user equipment of which service flows are beared by the eHRPD system. The eAN/ePCF maintains a mapping relation between the eHRPD air interface radio bearer and a Y interface data plane connection. The eNB maintains a mapping relation between the Y interface data plane connection and an S1-U connection.

Thereafter, the user equipment may send and receive data in the eHRPD network system and the LTE network system simultaneously.

Figure 11:
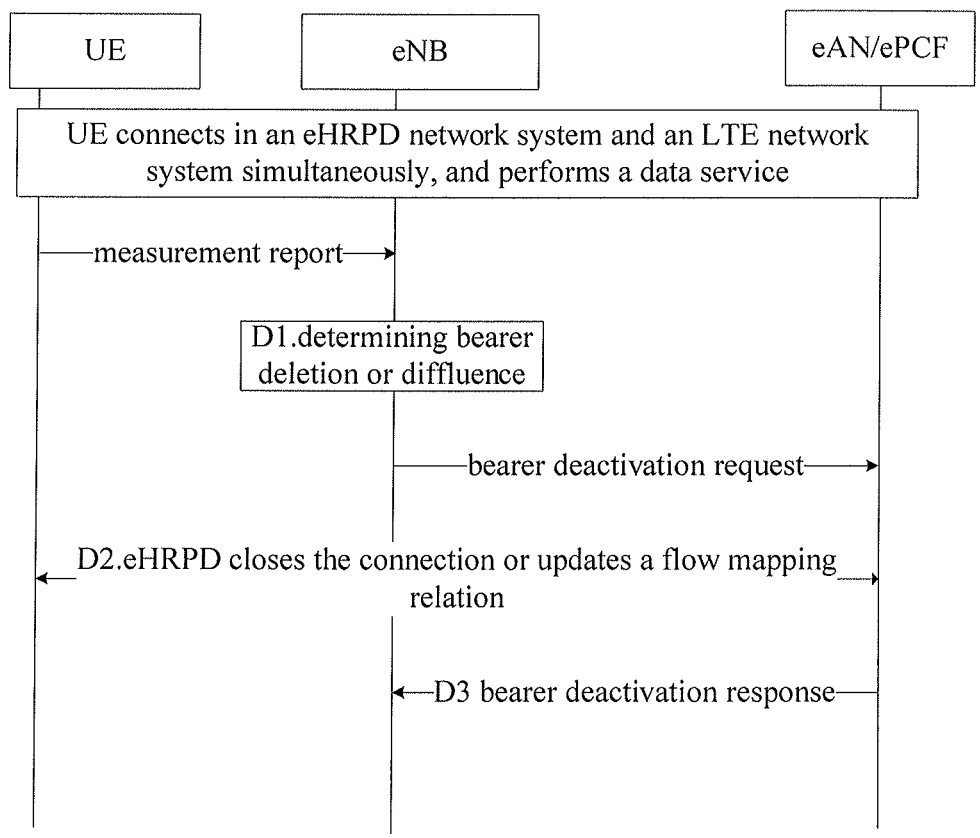

In the process that the user equipment may send and receive data in the eHRPD network system and the LTE network system simultaneously, the eNB may modify and delete the bearer according to the carrier information of the eHRPD network system at any time, in order to enable the target carrier to quit carrier aggregation, specifically, as shown in FIG. 11, including the following steps:

D1. when the eHRPD network system does not meet a second preset condition, the eNB updates the mapping relation between the service and the bearer and requests the eAN/ePCF to implement bearer modification, and when the eHRPD network system does not meet a third preset condition, the eNB sends a bearer deactivation request to the eAN/ePCF and requests to delete the bearer of the eHRPD network system.

D2. the eAN/ePCF closes the connection with the user equipment, so as to enable the target carrier to quit the carrier aggregation, and if only a part of bearer is modified, the eAN/ePCF updates a flow mapping relation with the user equipment.

D3. after the eAN/ePCF closes the connection with the user equipment, the eAN/ePCF feeds back the information that the bearer has been deactivated to the eNB.

The above-mentioned implementations are merely used for illustrating the present invention, rather than limiting the present invention. Those of ordinary skill in the related technical filed could make a variety of changes and variations without departing from the spirit and scope of the present invention. Accordingly, all equivalent technical solutions belong to the scope of the present invention, and the patent protection scope of the present invention should be defined by the claims.

What is claimed is:

1. A method for accessing network system, comprising the steps of:
   receiving, by a first network device of a first network system, a measurement report of a second network system sent by a user equipment of the first network system;
   determining, by the first network device, a second network device in the second network system according to the measurement report; and
   sending, by the first network device, a bearer setup request to the second network device through an interface X, for enabling the second network device to set up a cellular connection with the user equipment.

2. The method of claim 1, wherein the measurement report comprises carrier information of the second network system, and the carrier information comprises carrier frequency information and carrier signal strength information or carrier signal quality information.

3. The method of claim 2, wherein the determining a second network device in the second network system comprises:
   selecting, by the first network device, a network device corresponding to a carrier with strongest signal strength or best signal quality in the second network system as the second network device, according to the carrier information.

4. The method of claim 1, wherein after receiving the measurement report, the first network device determines whether a service is processed by the first network system, or processed by the second network system, or co-processed by the first network system and the second network system, according to a Quality-of-Service (QoS) requirement of the service and carrying capacity or load situations of the first network system and the second network system.

5. The method of claim 4, wherein when determining that the service is processed by the second network system, or co-processed by the first network system and the second network system, the first network device requests the second network device to set up a corresponding radio bearer for bearing the service according to the QoS requirement of the service.

6. The method of claim 5, wherein after setting up the radio bearer, the first network device stores a mapping relation between the bearer set up for the first network system and/or the second network system and the service.

7. The method of claim 5, wherein the first network device sets up a bearer between the first network device and the second network device according to the radio bearer set up by the second network device.

8. The method of claim 7, wherein after setting up the bearer between the first network device and the second network device, the first network device determines whether the second network device quits a service related to the user equipment or modifies a beared service, according to a received latest measurement report and/or the QoS requirement of the service.

9. The method of claim 1, wherein after setting up the connection with the user equipment by the second network device, the first network device receives a bearer setup response sent by the second network device.

10. The method of claim 1, wherein the first network device is an evolved access network and/or packet control function entity (eAN/ePCF), the first network system is an evolved high rate packet data (eHRPD) network system, the second network device is an evolved Node B (eNB), and the second network system is a long term evolution (LTE) network system.

11. A network device, configured to enable a user equipment to access to a core network of a first network system, comprising:
   a receiver, configured to receive a measurement report of a second network system sent by the user equipment;
   a processor, configured to find out a second network device of the second network system according to the measurement report; and
   a sender, configured to send a bearer setup request to the second network device, for enabling the second network device to set up a connection with the user equipment; wherein the bearer setup request comprises related information of the user equipment.

12. The network device of claim 11, wherein the receiver is further configured to, after the second network device sets up the connection with the user equipment, receive a bearer setup response message sent by the second network device.

13. The network device of claim 11, wherein the processor is further configured to, after the second network device sets up the connection with the user equipment, for a service related to the user equipment, determine whether the service is processed by the first network system, or processed by the second network system, or co-processed by the first network system and the second network system, according to a Quality-of-Service (QoS) requirement of the service and carrying capacity or load situations of the first network system and the second network system.

14. The network device of claim 13, wherein:
the processor is configured to, when determining that the service is processed by the second network system, or co-processed by the first network system and the second network system, generate a second network system bearer setup request according to the QoS requirement of the service, for enabling the second network device to set up a corresponding radio bearer for bearing the service.

15. The network device of claim 14, wherein:
the processor is further configured to, in accordance with the radio bearer set up by the second network device, set up a corresponding bearer between the network device and the second network device.

16. The network device of claim 15, wherein:
the processor is further configured to, after setting up the bearer between the network device and the second network device, determine whether the second network device quits the service related to the user equipment or modifies the beared service, according to a received latest measurement report and/or the QoS requirement of the service.

17. A network device, located in a second network system, comprising:
a receiver, configured to receive a bearer setup request from a first network device, wherein the bearer setup request comprises related information of a user equipment in a first network system; and
a processor, configured to set up a connection with the user equipment according to the related information of the user equipment, and set up a bearer used for bearing a service of the user equipment according to the bearer setup request.

18. The network device of claim 17, further comprising:
a sender, configured to send a bearer setup response to the first network device after the connection is set up.

19. The network device of claim 18, wherein the sender is further configured to send a paging message to the user equipment, for enabling the network device to set up a connection with the user equipment.

20. The network device of claim 19, wherein the receiver is further configured to receive a bearer deactivation request or a bearer modification request sent by the first network device; the processor disconnects or releases the connection with the user equipment according to the bearer deactivation request, and the processor modifies the bearer set up with the user equipment according to the bearer modification request.

21. The network device of claim 17, wherein the receiver is further configured to receive a request message sent by the user equipment, and set up the connection with the user equipment.

* * * * *